(12) United States Patent
Kister

(10) Patent No.: US 12,337,401 B2
(45) Date of Patent: Jun. 24, 2025

(54) MILLING TOOL, USE THEREOF AND MILLING PROCESS

(71) Applicant: CERATIZIT LUXEMBOURG S.A.R.L., Mamer (LU)

(72) Inventor: Fabien Kister, Mamer (LU)

(73) Assignee: CERATIZIT Luxembourg S.a.r.l., Mamer (LU)

( * ) Notice: Subject to any disclaimer, the term of this patent is extended or adjusted under 35 U.S.C. 154(b) by 396 days.

(21) Appl. No.: 17/928,432

(22) PCT Filed: Jun. 1, 2021

(86) PCT No.: PCT/EP2021/064655
§ 371 (c)(1),
(2) Date: Nov. 29, 2022

(87) PCT Pub. No.: WO2021/245068
PCT Pub. Date: Dec. 9, 2021

(65) Prior Publication Data
US 2023/0211425 A1      Jul. 6, 2023

(30) Foreign Application Priority Data

Jun. 2, 2020  (EP) .................................. 20177739

(51) Int. Cl.
*B23C 5/22*     (2006.01)
*B23C 5/28*     (2006.01)

(52) U.S. Cl.
CPC ............... *B23C 5/22* (2013.01); *B23C 5/283* (2022.02); *B23C 5/285* (2022.02);
(Continued)

(58) Field of Classification Search
CPC ..... B23C 5/22; B23C 5/283; B23C 2210/166; B23C 5/2226; B23C 5/28; B23C 5/285; B23C 2200/0411; B23C 2200/045; B23C 2222/84; B23C 2222/88; B23C 2200/208; B23C 5/2213; B23C 2210/16; B23C 5/2204
See application file for complete search history.

(56) References Cited

U.S. PATENT DOCUMENTS 5,340,242 A * 8/1994 Armbrust ................ B23B 25/02
407/4
6,053,669 A   4/2000 Lagerberg
(Continued)

FOREIGN PATENT DOCUMENTS

| CN | 103737091 A |   | 4/2014 |
| CN | 104439479   | * | 3/2015 |

(Continued)

*Primary Examiner* — Sara Addisu
(74) *Attorney, Agent, or Firm* — Laurence A. Greenberg; Werner H. Stemer; Ralph E. Locher

(57) ABSTRACT

A milling tool includes a cutting insert, a holder, a fastener and a shim. The fastener forms a first channel cooperatively with the cutting insert. The first channel is configured to direct coolant towards a top side of the insert. In order to better prevent thermal fatigue of the cutting insert under milling conditions, the shim includes a second channel configured to direct coolant towards a clearance side of the cutting insert. A method of using a milling tool and a milling process are also provided.

15 Claims, 7 Drawing Sheets

(52) U.S. Cl.
CPC . *B23C 2200/0411* (2013.01); *B23C 2200/045* (2013.01); *B23C 2210/166* (2013.01); *B23C 2222/84* (2013.01); *B23C 2222/88* (2013.01)

(56) References Cited

U.S. PATENT DOCUMENTS

| | | | |
|---|---|---|---|
| 7,625,157 B2 | 12/2009 | Prichard et al. | |
| 8,137,034 B2* | 3/2012 | Noureddine | B23B 29/04 407/103 |
| 8,215,878 B2* | 7/2012 | Rozzi | B23Q 11/1046 407/11 |
| 8,256,999 B2 | 9/2012 | Prichard et al. | |
| 8,328,471 B2* | 12/2012 | Nelson | B23Q 11/10 407/113 |
| 9,827,614 B2* | 11/2017 | Chen | B23B 27/1677 |
| 9,925,596 B2* | 3/2018 | Johansson | B23B 27/10 |
| 10,710,166 B2* | 7/2020 | Nagae | B23C 5/28 |
| 11,065,693 B2* | 7/2021 | Hirano | B23B 27/10 |
| 11,583,934 B2* | 2/2023 | Larsson | B33Y 80/00 |
| 11,590,580 B2* | 2/2023 | Lof | B23B 27/10 |
| 11,890,684 B2* | 2/2024 | Larsson | B23B 27/10 |
| 2007/0160432 A1* | 7/2007 | Eder | B23B 27/1629 407/113 |
| 2009/0320655 A1* | 12/2009 | Grant | B23B 29/04 29/564 |
| 2010/0172704 A1* | 7/2010 | Nelson | B23B 27/10 407/116 |
| 2011/0020072 A1* | 1/2011 | Chen | B23B 27/10 407/11 |
| 2011/0027024 A1* | 2/2011 | Prichard | B23Q 11/10 407/11 |
| 2011/0033249 A1 | 2/2011 | Prichard et al. | |
| 2011/0299944 A1* | 12/2011 | Hofermann | B23B 27/10 407/120 |
| 2012/0082518 A1* | 4/2012 | Woodruff | B23P 15/34 76/115 |
| 2012/0087746 A1* | 4/2012 | Fang | B23C 5/28 407/103 |
| 2012/0087747 A1* | 4/2012 | Fang | B23C 5/2213 407/11 |
| 2013/0051934 A1* | 2/2013 | Henry | B23B 27/164 407/11 |
| 2013/0078043 A1* | 3/2013 | Henry | B23B 27/1622 407/11 |
| 2013/0195565 A1* | 8/2013 | Chen | B23B 27/10 407/11 |
| 2015/0063926 A1* | 3/2015 | Wu | B23B 27/141 407/11 |
| 2016/0368061 A1* | 12/2016 | Harif | B23B 27/10 |
| 2017/0368612 A1* | 12/2017 | Imai | B23Q 11/10 |
| 2019/0047054 A1* | 2/2019 | Harif | B23B 27/10 |
| 2019/0118273 A1* | 4/2019 | Kawasaki | B23C 5/06 |
| 2020/0215618 A1* | 7/2020 | Hirano | B23B 27/10 |
| 2022/0176464 A1* | 6/2022 | Marbehant | B23B 27/1622 |
| 2023/0226626 A1* | 7/2023 | Arumugam | B23C 5/20 409/135 |
| 2024/0116113 A1* | 4/2024 | Hasegawa | B23B 27/10 |
| 2024/0246159 A1* | 7/2024 | Bergman | B23C 5/28 |
| 2024/0300028 A1* | 9/2024 | Yamaguchi | B23B 27/10 |

FOREIGN PATENT DOCUMENTS

| | | | | |
|---|---|---|---|---|
| DE | 3004166 A1 | | 8/1980 | |
| DE | 102014211414 B3 | * | 12/2015 | ............ B23B 29/06 |
| EP | 3330024 A1 | | 6/2018 | |
| EP | 3501700 A1 | | 6/2019 | |
| JP | 56069007 A | * | 6/1982 | |
| JP | H10166205 A | | 6/1998 | |
| JP | 2001287134 A | * | 10/2001 | |
| JP | 2006055917 A | | 3/2006 | |
| JP | 2010516482 A | | 5/2010 | |
| JP | 2013031923 A | | 2/2013 | |
| JP | 2018027605 A | | 2/2018 | |
| SE | 200950092 A1 | * | 6/2010 | ............ B23B 27/10 |
| WO | WO-2014207747 A2 | * | 12/2014 | ............ B23B 27/10 |
| WO | 2016054154 A1 | | 4/2016 | |

\* cited by examiner

MILLING TOOL, USE THEREOF AND MILLING PROCESS

FIELD AND BACKGROUND OF THE INVENTION

The present invention relates to a milling tool which comprises a cutting insert, a holder, a fastener and a shim, wherein the cutting insert comprises a cutting edge, a clearance side and an insert top side, the fastener is supported against the cutting insert by a head portion and secured to the holder by an axial portion, the axial portion extends through the cutting insert, the fastener forms cooperatively with the cutting insert a first channel, the first channel is configured to direct coolant towards the insert top side, the first channel is in fluid communication with a base channel of the holder, the shim is placed between the cutting insert and the holder, and the axial portion extends at least partly through the shim.

The present invention relates further to a use of such a milling tool and a milling process involving such a milling tool.

Milling tools are used for cutting with a rotational cutting movement around a rotation axis of a tool holder and with a feed movement that is perpendicular or oblique to the rotation axis.

Cutting inserts experience during milling high loads and frictional contact with both the workpiece and the machined chips. Thereby the cutting insert, in particular the cutting edge, is heated to very high temperatures, for example greater than 900° C. High cutting insert temperatures increase wear during milling and, thus, reduce the cutting insert service life. For that reason, coolant is typically used to cool the cutting insert during milling.

A milling tool with a coolant supply is known from US 2012 0087 747 A1. The milling tool comprises a cutting insert which is secured to a tool holder by a screw. The screw forms cooperatively with the cutting insert a gap. The gap serves as a coolant channel which guides coolant from a coolant bore of the tool holder through the cutting insert onto a top side of the cutting insert.

In milling applications with such a milling tool, the cutting insert experiences thermal cycling during each rotation of the tool holder; unlike turning tools, drilling tools and reaming tools where a corresponding cutting insert is in permanent contact with the workpiece during operation of each of said cutting tools.

As the cutting insert enters and exits the material of the workpiece on each rotation during milling, the cutting insert heats up when it is cutting the material due to friction and cools down when it is not cutting the material, i.e. the cutting insert is subjected to a thermal cycle on each rotation.

During thermal cycling of the cutting insert during milling, the differences in thermal expansion between different parts of the insert commonly initiate the formation and cause the successive propagation of cracks in the cutting insert. This may lead to insert failure through thermal fatigue.

It has been found that the coolant supply known from US 2012 0087 747 A1 is not able to suppress the detrimental differences in thermal expansion sufficiently, especially not for milling materials with low thermal conductivity and high yield stress values.

SUMMARY OF THE INVENTION

The objective of the present invention is to provide a milling tool, a use thereof and a milling process, to better prevent thermal fatigue of the cutting insert under milling conditions.

The objective is solved by a milling tool according to the independent claim and as described below. The preferred embodiments of the milling tool are described in the dependent claims.

The milling tool comprises: a cutting insert, a holder, a fastener and a shim, wherein the cutting insert comprises a cutting edge, a clearance side and an insert top side, the fastener is supported against the cutting insert by a head portion and secured to the holder by an axial portion, the axial portion extends through the cutting insert, the fastener forms cooperatively with the cutting insert a first channel, the first channel is configured to direct coolant towards the insert top side, the first channel is in fluid communication with a base channel of the holder, the shim is placed between the cutting insert and the holder, the axial portion extends at least partly through the shim, the shim comprises a second channel configured to direct coolant towards the clearance side, and the second channel is in fluid communication with the base channel.

Since the second channel is configured to direct coolant towards the clearance side the cutting insert is supplied with a permanent coolant jet independent of whether the cutting insert is cutting the material of a workpiece or not. That is because the clearance side contributes to the sharpness of the cutting edge but avoids contact with the workpiece during milling, i.e. the clearance side does not enter the material during cutting.

Hence, in addition to the cooling obtained by the first channel, the difference between the temperature of the cutting insert when it is cutting and the temperature of the cutting insert when it is rotated away from the material to be milled (not cutting) becomes even smaller on parts of the cutting insert due to the permanent coolant supply from the second channel towards the clearance side. Since the temperature amplitude of the thermal cycles is reduced, differences in thermal deformation of the cutting insert reduce as well, which leads to less thermal fatigue during milling, i.e. a longer lifetime of the cutting insert.

In contrast, if the additional coolant supply from the second channel would be realized outside of the shim, e.g. at a position above the cutting insert in the holder, the coolant supply would be interrupted by machined chips running across the insert top side, i.e. rendering the coolant supply merely therefrom insufficient in terms of cooling the cutting insert during milling.

The second channel intersects for example a shim top side of the shim; typically, the shim is a plate which has a shim bottom side adapted to a base side of the holder and the shim top side adapted to a bottom side of the cutting insert.

The shim top side may be shaped opposite to the bottom side of the cutting insert, i.e. a protrusion extending away from the bottom side of the cutting insert may thus rest in a depression of the shim top side which fits to the protrusion.

The shim top side may be facetted with outer facets inclined from a middle facet; a facet is a plane surface portion differently inclined from its neighboring facets.

It is also possible that the shim top side is flat to fit to a correspondingly flat insert bottom side.

The shim contacts the cutting insert by at least a middle part of its shim top side or, alternatively or additionally, by outer parts of the shim top side in this regard.

The second channel may intersect one or more of said outer facets of the shim. The middle facet may contact an insert bottom side of the cutting insert.

The cutting insert may be indexable, such that the cutting insert can be rotated around a central axis of the fastener, wherein a second cutting edge or a different part of a cutting edge is positioned in a cutting position with coolant supply provided for from the second channel. The insert bottom side may be flat to fit onto a flat shim top side.

The cutting insert may be, alternatively or additionally, also indexable, such that the insert top side can be flipped upside down, wherein the former insert bottom side becomes the insert top side and a former lower cutting edge of the insert bottom side is positioned in a cutting position with coolant supply provided for from the second channel. The insert bottom side may be shaped like the insert top side, e.g. having a facetted shape with a depression for disposal of the fastener therein, to provide for the same cutting and chip guiding conditions at both sides.

Said facetted geometry of the shim is especially suitable for the indexable embodiment of the cutting insert, where the insert top side can be flipped upside down to make other cutting edges active.

The outer facets of the shim allow to accommodate inclined edges of the cutting insert facing towards the shim; such an inclined edge can be a cutting edge of the cutting insert which is not positioned in an active cutting position. The shim may have when viewed in a top view along a middle axis of the fastener the shape of a triangle with for example facetted or rounded corners.

Moreover, it has been found that cooling the cutting edge—the part of the cutting insert most susceptible to thermal shock—is enhanced, when the first channel and the second channel are each additionally configured to direct coolant such that the corresponding coolant jets cross each other at the cutting edge.

The cutting insert may comprise a through hole which intersects the insert top side and the insert bottom side. The fastener extends through the cutting insert by extending through its through hole.

The fastener may be a screw where the head portion is a screw head and the axial portion is a screw shaft with a threaded section extending at least partly along the screw shaft. The head portion, e.g. the screw head, may be disposed within the through hole of the cutting insert, such that the first channel is formed jointly by a first gap between the head portion and the through hole of the cutting insert, and by a second gap between the axial portion, e.g. the screw shaft, and the through hole of the cutting insert. The first gap and the second gap form the first channel. On parts where the head portion is disposed within the through hole of the cutting insert the through hole can comprise a recess. The recess helps to direct coolant to the cutting edge, for example from a position at the insert top side below the cutting edge upwards to the cutting edge.

The insert top side can comprise an open channel structure which works together with the first channel to guide coolant to the insert top side, especially to where the cutting edge is formed on parts of the insert top side. The open channel structure may be formed by one or more depressions of the insert top side.

The cutting edge may be a main cutting edge, wherein the cutting insert may comprise a shorter secondary cutting edge joined to the main cutting edge by a cutting corner. The secondary cutting edge may be a wiper cutting edge.

The second channel is configured preferably to direct coolant towards the main cutting edge which is typical more in need of coolant than the secondary cutting edge.

The shim may comprise a through hole positioned coaxially with the through hole of the cutting insert. The axial portion may extend at least partly through the through hole of the shim. The through hole of the shim may be in fluid communication with the first channel and the second channel, such that coolant can flow from the base channel through the through hole of the shim into each of the first channel and second channel. This adds further to a compact realization of the coolant supply because the space of the through hole of the shim is not only used to accommodate the axial portion as far as it extends therein but also as a part of the coolant supply.

A further advantage of the milling tool lies in its compact design. That is because the interior of the holder, which can also be called a tool holder in the present disclosure, the cutting insert and the shim work together as coolant conduit means; the holder typically comprises a recess comprising the shim and the cutting insert.

The fastener extends through a through hole of the cutting insert, wherein the through hole of the cutting insert intersects the insert top side and intersects an insert bottom side of the cutting insert opposite to the insert top side. The fastener enters the through hole and exits the through hole on opposite sides of the through hole.

Preferably the milling tool comprises one assembly, wherein the assembly comprises the cutting insert, the shim and the fastener in one of the embodiments disclosed herein.

Preferably the milling tool comprises at least two assemblies, wherein each assembly comprises a cutting insert, a shim and a fastener, and the assemblies are positioned equally spaced apart in a circumferential direction about an axis of rotation of the holder. At least one assembly comprises the cutting insert, the shim and the fastener in one of the embodiments disclosed herein. The two or more assemblies enhance the cutting performance of the milling tool.

According to a further embodiment of the milling tool the second channel has an outlet opening which is covered partly by the cutting insert on parts of the clearance side, such that coolant can still exit from the second channel but is obstructed by the cutting insert. This decreases the temperature of the cutting insert even further because the clearance side can be flooded with coolant from below, i.e. a stream of coolant is guided along the clearance side from below.

According to a further embodiment of the milling tool the shim comprises a plurality of shim channels, the second channel is a shim channel of the plurality of shim channels, each shim channel is configured to direct coolant towards the clearance side, each shim channel is in fluid communication with the base channel, and each shim channel has an outlet opening, which is covered partly by the cutting insert on parts of the clearance side, such that coolant can still exit from each of the shim channels but is obstructed by the cutting insert. The additional advantage of this embodiment is that the plurality of shim channels, i.e. at least two shim channels of which one is the second channel, render the coolant supply from the shim to the clearance side redundant against clogging. In other words, if only the second channel is realized, which is also feasible within the present disclosure, its clogging would terminate the coolant supply to the clearance side. Having the plurality of shim channels, clogging of a number smaller than the maximum number would still allow for coolant supply from the remaining shim channels. The outlet openings of the shim channels may have any shape, e.g. round or polygonal, may be juxtaposed along the cutting edge, which may be—in a top view onto the insert top side viewed along a middle axis of the fastener—curved or straight.

According to a further embodiment of the milling tool an outlet opening of the second channel is shaped to follow at least a section of the cutting edge, such that the cutting edge can obstruct a coolant jet from the second channel. In a top view onto the cutting insert, e.g. along a middle axis of the fastener, facing the insert top side, the cutting edge crosses the outlet opening of the second channel. Thus, coolant from the second channel is obstructed by the cutting edge on parts of the clearance side, such that the cutting edge is supplied with coolant from the second channel. The outlet opening of the second channel may be oblong as to follow the section of the cutting edge which may be—in a top view onto the insert top side viewed along the middle axis of the fastener—curved or straight. When the cutting edge is straight, the outlet opening is e.g. oblong with an maximum extension along a straight line that flows the contour of the cutting edge.

According to a further embodiment of the milling tool at least two outlet openings of the shim channels are positioned to follow at least a section of the cutting edge, such that the cutting edge can obstruct each coolant jet from each of the shim channels belonging to each of the at least two outlet openings. Thereby the same advantage is realized as by the directly preceding embodiment. When the cutting edge is curved, the outlet openings are aligned along a curved line that follows the contour of the cutting edge where it is curved, e.g. an arc line.

According to a further embodiment of the milling tool the second channel widens towards the cutting insert. Hence, the cross section of the second channel increases in a direction towards the cutting insert. The coolant jet formed by the second channel thus spreads farther out in order to cover a bigger area of the clearance side. Consequently, cooling on parts of the clearance side is enhanced.

According to a further embodiment of the milling tool the shim is configured and positioned, such that coolant can flow through the shim into the first channel and second channel. The shim becomes part of a coolant conduit channel structure which extends through the holder by the base channel, the cutting insert by the first channel and the shim by the second channel, wherein the second channel is in fluid communication with the base channel by the shim alone or cooperatively by the shim and the holder together. The space available for coolant supply towards the insert top side and the clearance side is used within an interior made from the holder, the shim, the cutting insert and the fastener.

According to a further embodiment of the milling tool a distribution channel is formed cooperatively by the shim and the holder, such that coolant can flow from the base channel through the distribution channel into the first channel, and wherein the axial portion extends at least partly through the distribution channel, such that coolant can flow around the axial portion. This adds to the compact design of the milling tool, especially to its assembly made from the shim, the cutting insert and the fastener. Besides the shim and the holder no extra parts are needed to supply the first channel with coolant from the base channel. Hence, either the shim, the holder or both comprise a depression, wherein the depression forms a cavity between the shim and the holder. The shim can be pressed against a base side of the holder by the cutting insert, such that the cavity is sealed against an external environment of the holder. The cavity is in direct fluid communication with the base channel, wherein the first channel branches off the cavity. Unlike a distribution channel formed by the shim alone, the described distribution channel can be manufactured directly into a precursor surface of the holder and/or the shim; a precursor surface is a surface prior to final machining, e.g. milling and/or pressing, of the shim and the tool holder, respectively. Additionally, this embodiment allows for that the shim can be devoid of a separate hole, e.g. another through hole, to accommodate the fastener on parts of its axial portion.

According to a further embodiment of the milling tool the distribution channel is formed, such that coolant can flow from the base channel around the axial portion into the second channel. Hence, enough space is left on parts of the axial portion and the shim, such that coolant can pass into the second channel, for example by making a through hole of the shim large enough. An additional bypass channel is avoided outside of the through hole of the shim.

According to a further embodiment of the milling tool the distribution channel is formed on parts of the shim by an open channel structure facing towards the holder. Hence, the milling tool can be manufactured with fewer processing steps since it is allowed for that the side of the tool holder against which the shim is pressed may be a plane surface. Additionally, under this embodiment clogging of the distribution channel can be cleared by simply removing the shim and cleaning the easily accessible open channel structure.

According to a further embodiment of the milling tool the holder comprises a holder channel formed by the holder alone, wherein the holder channel is configured to direct coolant towards the insert top side from an outlet opening of the holder channel which is positioned above the insert top side. A coolant jet from the holder channel enhances chip evacuation from the insert top side. As such, coolant is supplied jointly from the first channel, the second channel, alternatively from each of the plurality of shim channels including the second channel, and the holder channel. The holder channel may be in fluid communication with the base channel.

According to a further embodiment of the milling tool the axial portion comprises a threaded part which is engaged with the holder beneath the shim. The fastener is secured to the holder by engaging on parts of its threaded part with the holder. In that the fastener is engaged beneath the shim space is saved in comparison to a clamping mechanism where a lever extends from the head portion out of the cutting insert and into the tool body space—in a top view—next to the cutting insert and shim. Thus, this embodiment adds further to the compact design of the milling tool.

It will be appreciated that due to that the bushing is supported against the shim it is additionally pressed against the tool holder. The bushing can be supported against the shim by a lip portion which abuts a recess of the shim. The bushing is a releasable part of the milling tool which can be chosen depending on the design of the fastener.

According to a further embodiment of the milling tool the second channel is configured to direct coolant towards the cutting edge, the cutting edge is formed at a top of a protrusion and the protrusion protrudes at least as far out from the insert top side as the head portion. In other words, looking onto the clearance side the head portion is not visible. It will be appreciated that this is beneficial for a smooth chip conduction on parts of the insert top side since the chip conduction can occur unobstructed by the head portion which also helps to increase the area of the insert top side available to the coolant from the first channel. Additionally, the outer dimensions of the mounted assembly made from the shim, the cutting insert and the fastener are defined by the cutting insert and the shim only, which contributes to a compact design of the milling tool.

The objective is also solved by a use of the milling tool according to the independent claim and as described below and the use according to the dependent claims.

The milling tool disclosed herein is used for milling a workpiece. The holder is rotated about an axis of rotation of the holder while coolant is flowing through and out of each of the first channel and second channel; when the holder comprises the holder channel coolant is flowing through and out of out the holder channel as well. The constant coolant supply achieved by the first channel and second channel jointly decreases the temperature of the cutting insert during both cutting and non-cutting on each rotation of the holder.

Preferably the milling tool is used to mill the workpiece, wherein the workpiece is made from a titanium based alloy or stainless steel. "titanium based alloy" means any titanium alloy where the single largest component in terms of mass composition of that alloy is titanium, such as for example a titanium alloy with 6 mass percent aluminum, 4 mass percent vanadium and 90 mass percent titanium. Especially with regard to the titanium based alloy and stainless steel the use of the milling tool disclosed herein is beneficial. That is because titanium based alloys and stainless steel have each a high yield strength and low thermal conductivity. In other words, large cutting forces in combination with a limited heat transport into the workpiece occur during milling. These factors increase the temperature of the cutting insert during cutting and thereby the risk for thermal shock on each rotation of the milling tool. The constant cooling of the clearance side decreases—in addition to the cooling of the insert top side by the first channel—the temperature of the cutting insert on each rotation of the milling tool. Hence, the tool lifetime is increased.

The objective is also solved by a milling process according to the independent claim and as described below and the milling processes according to the dependent claims.

The milling process comprises the steps: providing a milling tool disclosed herein, providing a workpiece and milling the workpiece with the milling tool. The advantages of the milling process are same as the ones disclosed for the use of the milling tool.

Preferably in the milling process the workpiece is made from a titanium based alloy or stainless steel. The advantages related thereto are the same as the ones disclosed for the use of the milling tool for milling said materials.

Further features of the present disclosure, as well as the advantages derived therefrom, will become clear from the drawing.

DETAILED DESCRIPTION OF THE INVENTION

Identical reference symbols in the figures denote identical or functionally identical components.

Figure 1:
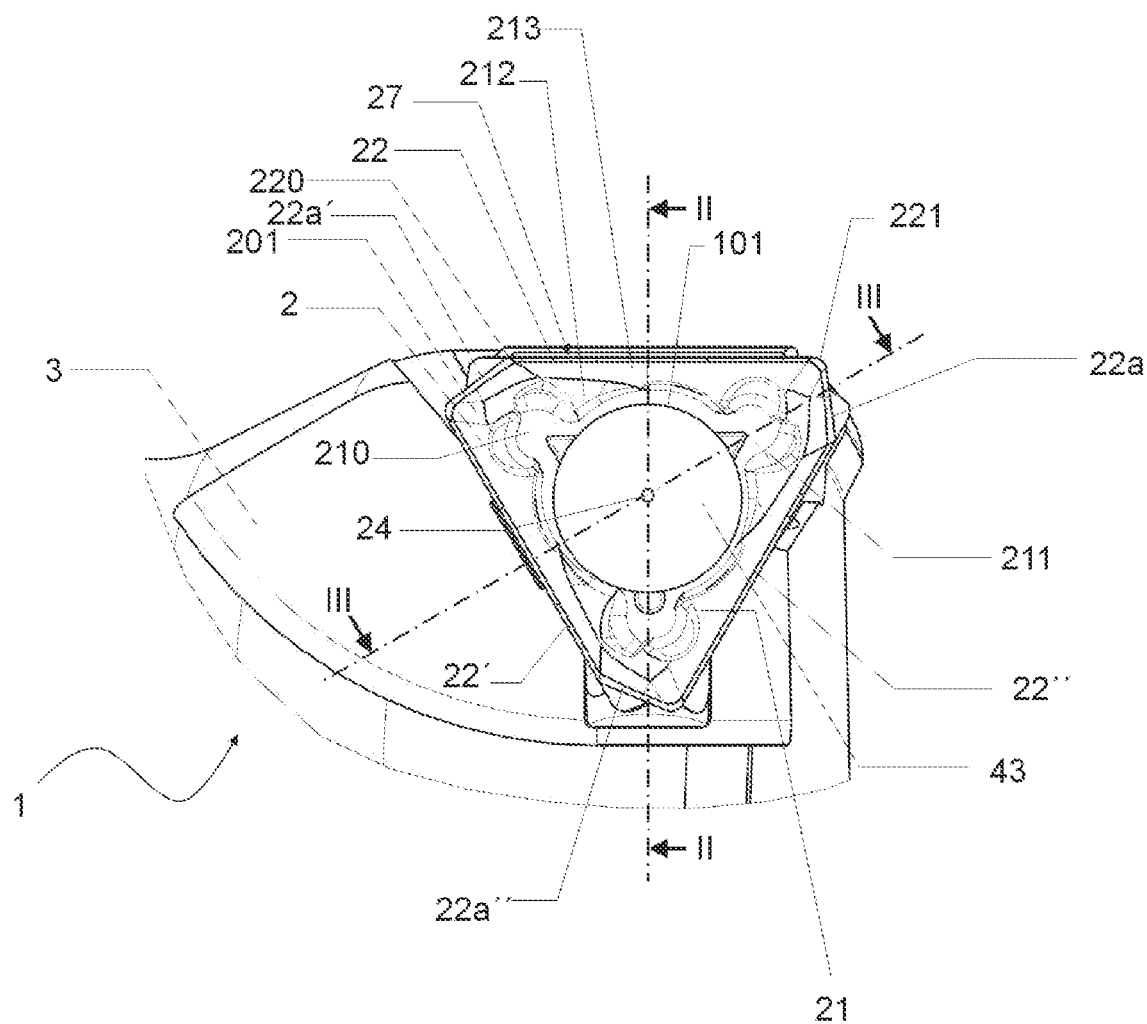
FIG. 1 is a schematic top view of a first embodiment of a milling tool according to the present disclosure.
Figure 2:
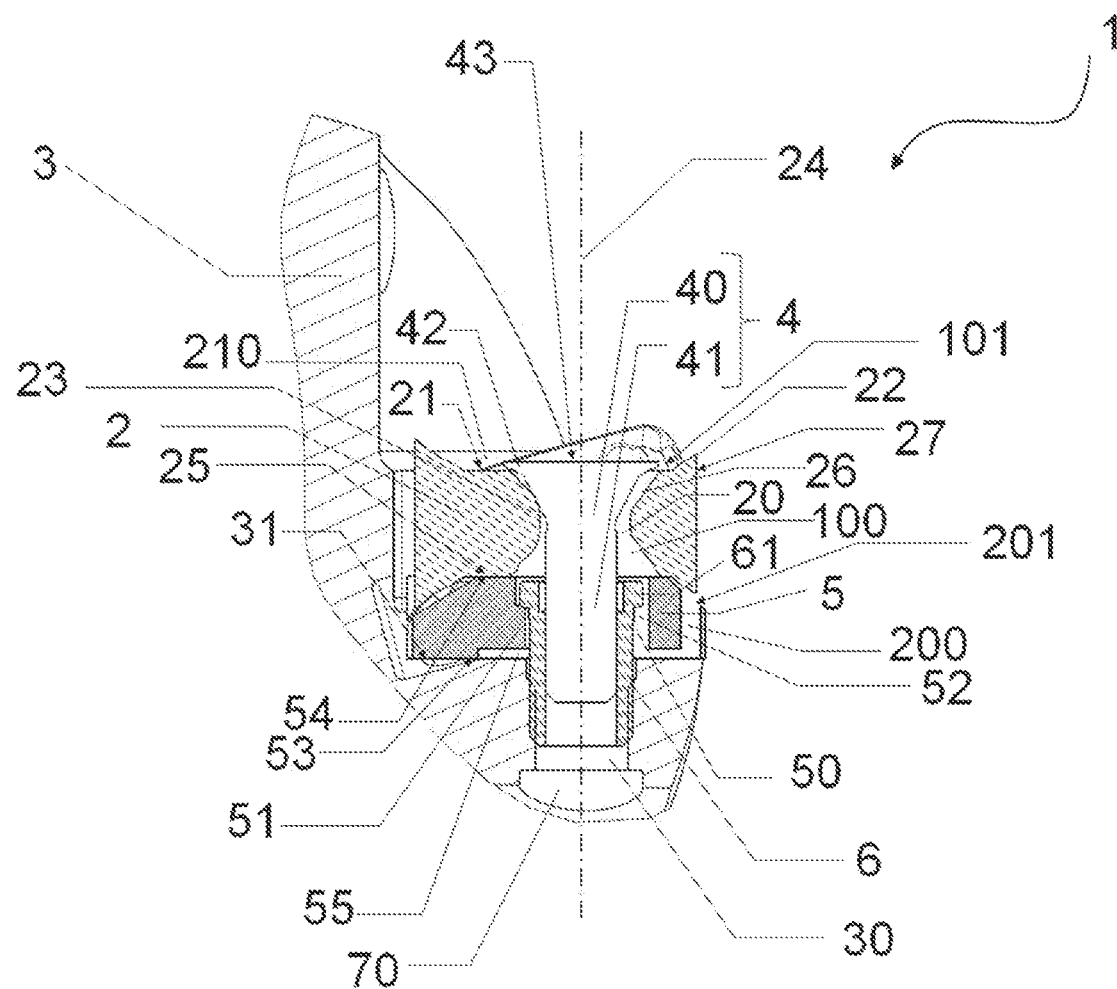
FIG. 2 is a schematic cross-sectional view along the line II-II of the milling tool embodiment depicted in FIG. 1.
Figure 3:
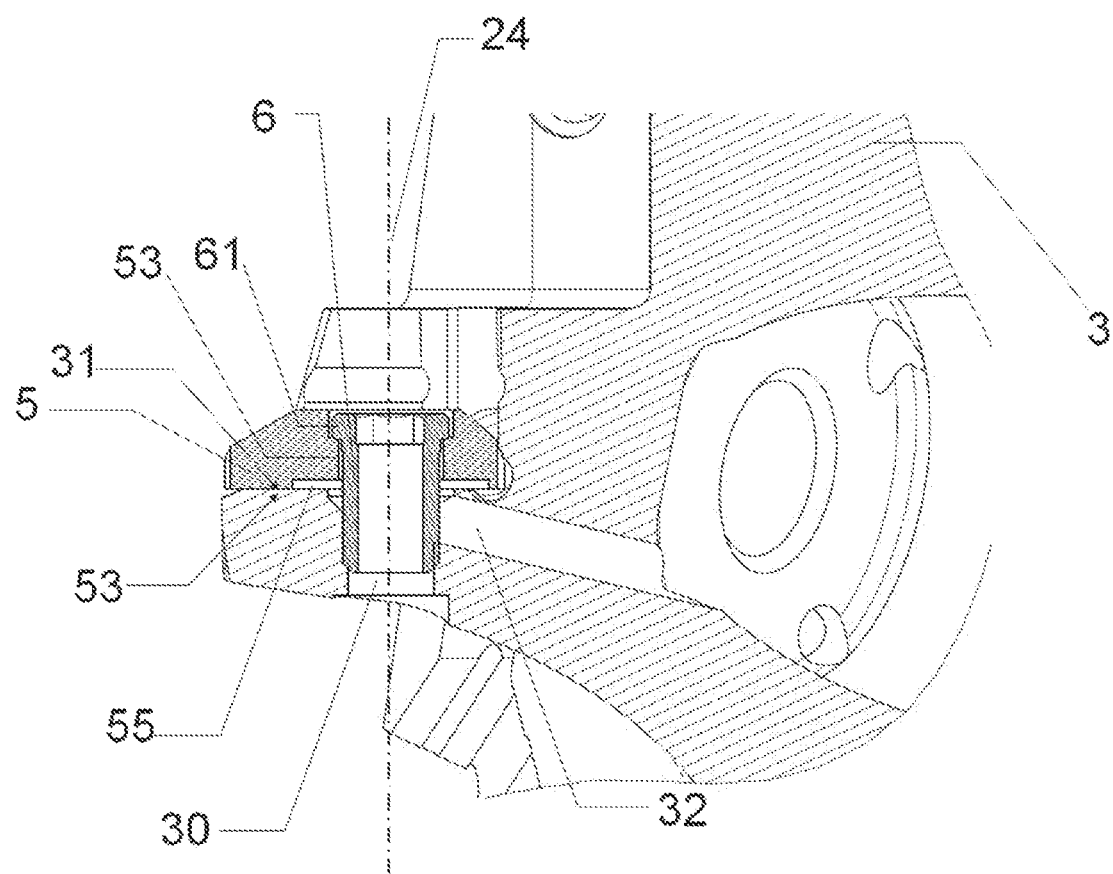
FIG. 3 is a schematic cross-sectional view along the line III-III of the milling tool embodiment depicted in FIG. 1.

Referring to FIGS. 1 to 3 there is shown a first embodiment of a milling tool 1 which comprises a cutting insert 2, a holder 3, a fastener 4 and a shim 5.

The shim 5 is positioned between the cutting insert 2 and the holder 3. The fastener 4 extends through a through hole 20 of the cutting insert 2 and a through hole 50 of the shim 5 into the holder 3 beneath the shim 5.

The fastener 4 has a fastening function and a coolant supply function.

The fastening function of the fastener 4 is to secure the cutting insert 2 to the holder 3. The coolant supply function of the fastener 4 is to guide coolant cooperatively with the cutting insert 2 on parts of its through hole 20 onto an insert top side 21 of the cutting insert 2. Coolant flows along the insert top side 21 towards a cutting edge 22 of the cutting insert 2; the cutting edge 22 is formed on top of a protrusion of the insert top side 21, such that the cutting edge 22 can be described as a ridge.

The shim 5 cooperates with the fastener 4 as the cutting insert 2 is pressed against the shim 5 when the fastener 4 is engaged with the holder 3 as depicted in FIG. 2, i.e. the shim 5 serves as a support for the cutting insert 2.

At the same time the shim 5 has a coolant supply function.

The coolant supply function of the shim 5 is to direct coolant towards a clearance side 27 of the cutting insert 2; the cutting edge 22 joins the clearance side 27 to the insert top side 21 and vice versa. The coolant supply to the clearance side 27 is realized by a channel 200 formed by the shim 5 alone and positioned such that the cutting insert 2 obstructs a coolant jet emerging from an opening 201 of the channel 200. The obstruction is especially revealed in FIG. 2 where it is shown that the cutting insert 2 partly overlaps the opening 201. Thereby a stream of coolant can flood the clearance side 27 from below.

Referring to the fastening function of the fastener 4 a conical head portion 40 of the fastener 4 is disposed within the through hole 20 and abuts three insert abutment protrusions 23 of the cutting insert 2. The insert abutment protrusions 23 are spaced equally apart from each other in a peripheral direction around a central axis 24 of the through hole 20; the central axis 24 is also a central axis of the through hole 50.

A cross-section of one of the three insert abutment protrusions 23 is depicted in FIG. 2. It is shown exemplarily in FIG. 2 for each of the insert abutment protrusions 23 that the insert abutment protrusions 23 are convex in a cross-section containing the axis 24.

An axial portion 41 of the fastener 40 extends from the head portion 40 through the through hole 20 towards the holder 3.

The axial portion 41 extends with regard to the cutting insert 2 contact-free through the cutting insert 2, unlike the head portion 40 which abuts the cutting insert 2 on the insert abutment protrusions 23.

The axial portion 41 exits the through hole 20 at an insert bottom side 25 of the cutting insert 2. The insert bottom side 25 is shaped identically to the insert top side 21 rendering the cutting insert 2 thereby indexable.

The axial portion 41 extends from the insert bottom side 25 into a bushing 6. The axial portion 41 has a not depicted threaded section extending along its axial extension. The axial portion 41 is engaged by its threaded section with a not depicted threaded section formed inside of the bushing 6. The bushing 6 extends into a hole 30 of the holder 3 where a threaded section formed on the outside of the bushing 6 is engaged with a threaded section of the holder 3 formed within the hole 30.

The hole 30 is sealed against an environment of the milling tool 1 by a plug 70.

The bushing 6 has a bushing abutment protrusion 61 extending entirely in a peripheral direction around the axis 24 which is a central axis for each of the bushing 6 and the hole 30. The bushing abutment protrusion 61 abuts a shim abutment protrusion 51 of the shim 5. The peripheral extension of the shim abutment protrusion 51 around the axis 24 is interrupted by a shim axial recess 52.

When the bushing 6 is screwed into the hole 30 as depicted in FIG. 2, the shim 5 is pressed against the holder 3 by the engagement of the bushing abutment protrusion 61 with the shim abutment protrusion 51. Thereby a shim bottom side 53 of the shim 5 is pressed against a base side 31 of the holder 3.

When the fastener 4 is screwed by its axial portion 41 into the bushing 6 as depicted in FIG. 2 the head portion 40 abuts each of the insert abutment protrusions 23 such that the cutting insert 2 is pressed against the shim 5. Thereby the insert bottom side 25 is pressed against a shim top side 54 of the shim 5.

It will be appreciated that the fastening function of the fastener 4 can be realized without the bushing 6 as well by e.g. selecting a larger diameter of the axial portion 41 such that the axial portion 41 can be screwed directly into the hole 30.

Referring to the coolant supply function of the fastener 4, the head portion 40 and the axial portion 41 form cooperatively with the cutting insert 2 a channel 100 within the through hole 20.

The channel 100 is formed on parts of the cutting insert 2 by one of three insert recesses 26 (one of the recesses 26 is depicted in a cross-section in FIG. 2) and by the remainder of the through hole 20 below to the insert recesses 26 and where the axial portion 41 and the cutting insert 2 are contact-free with respect to each other within the through hole 20.

The insert recesses 26 are spaced in a peripheral direction equally apart from each other about the axis 24. Thereby the insert abutment protrusions 23 are separated in a peripheral direction and equally from each other by the insert recesses 26.

When viewed in a three-dimensional projection it is revealed that each insert recess 26 is shaped as a part of a funnel-type surface which slopes downwards from the insert top side 21.

It will be appreciated that the entire cutting insert 2 and thereby the through hole 20 are mirror-symmetrical with respect to a mirror-plane oriented perpendicular to the axis 24 and intersecting the cutting insert 2 at a position where the diameter of the through hole 20 is smallest, i.e. at a distance halfway from the insert top side 21 to the insert bottom side 25 measured parallel to the axis 24.

The channel 100 is in fluid communication with the shim axial recess 52.

The shim axial recess 52 is in fluid communication with a distribution channel 55 formed cooperatively by the shim bottom side 53 and the base side 31. Thereby coolant can flow from the distribution channel 55 through the shim axial recess 52 into the channel 100 and out of an opening 101 of the channel 100 formed cooperatively by the insert top side 21 and a rim section 42 of the head portion 40.

The rim section 42 is terminated by a plane top surface 43 of the fastener 4.

Being plane and positioned below the cutting edge 22 in a cross section containing the axis 24 (FIG. 2) the top surface 43 and thereby the extension of the head portion 40 are reduced to a minor obstacle for the machined chips conducted along the insert 21 top side.

Since the top surface 43 is positioned below the cutting edge 22 in a cross section containing the axis 24, the milling tool 1 has in its corresponding axial dimension along the axis 24 a compact design.

The channel 200 is also in fluid communication with the distribution channel 55 as the channel 200 branches off the distribution channel 55 in a direction parallel to the axis 24.

In FIG. 1 it is especially revealed that when viewed parallel along the axis 24 the cutting edge 22 crosses the opening 201. Thereby coolant emerging from the opening 201 can reach the part of the clearance side 27 directly adjacent to the cutting edge 22.

FIG. 1 and FIG. 2 reveal together that the insert top side 21 has a depression 210, such that coolant emerging from the opening 101 can flow along a plane bottom surface 211 of the depression 210 and therefrom upwards along a facetted protrusion 212 of the insert top side 21 towards the cutting edge 22.

As depicted in FIG. 1 the facetted protrusion 212 surrounds the top surface 43 completely along a peripheral direction about the axis 24.

A major facet 213 of the facetted protrusion 212 is directly adjacent to the cutting edge 22 and serves as a primary rake surface for chip conduction.

The cutting edge 22 is a major cutting edge of the cutting insert 2 and positioned in an active cutting position as apparent from FIG. 1.

The cutting edge 22 is joined by a cutting corner 221 to a shorter minor cutting edge 22a which serves as an active wiper cutting edge during milling with the cutting edge 22. The cutting corner 221 becomes thereby active as well.

The cutting edge 22 inclines from a cutting corner 220 downwards to the cutting corner 221.

It will be appreciated that the cutting insert 2 has two further cutting edges 22' and 22" which are each designed analogously to the cutting edge 22, i.e. when being positioned each actively like the cutting edge 22 they cross the opening 201 to be cooled by coolant emerging from the opening 201.

The cutting edge 22' has a minor cutting edge 22a', the cutting edge 22a' a minor cutting edge 22a".

When the fastener 4 is loosened or removed from the holder 3 the cutting insert 2 can be rotated around the axis 24 in steps of 120° such that the cutting edges 22' and 22a' or 22" and 22a" become cooperatively active. Each of the cutting edges 22' and 22" join the insert top side 21 to a clearance side designed analogously to the clearance side 27, i.e. the other clearance sides can be supplied each with coolant once the corresponding cutting edges 22' and 22" are positioned actively.

It will further be appreciated that the cutting insert 2 has cutting edges identical to the cutting edges 22, 22a, 22', 22a', 22" and 22a", revealed by a view onto the insert bottom side 25 in a viewing direction parallel to the axis 24. Thus, when the insert bottom side 25 is turned upside the cutting edges associated with the insert bottom side 25 can be used similarly to the cutting edges 22, 22a, 22', 22a', 22" and 22a".

Since the cutting edges 22, 22' and 22" and thereby the corresponding cutting edges of the insert bottom side 25 are each inclined, the surface area of the insert bottom side 25 available to be pressed against the base side 31 is reduced in comparison to a plane design of the insert bottom side 25. The shim 5, however, has its shim top side 54 configured for a plane matching with the insert bottom side 25; the same holds when the insert top side 21 is turned downside to face the shim 5. The shim 5 thereby enhances the mechanical stability of how the cutting insert 2 is secured by the fastener 4 to the holder 3.

Referring to FIG. 3 (depicting in a cross-section containing the axis 24 the shim 5, the bushing 6 and the holder 3 without the cutting insert 2) the holder 3 has a base channel 32 which intersects the hole 30, such that the distribution channel 55 is in fluid communication with the base channel 32, i.e. coolant can flow from the base channel 32 into the distribution channel 55 an therefrom into each of the channel 100 and the channel 200.

Figure 4:
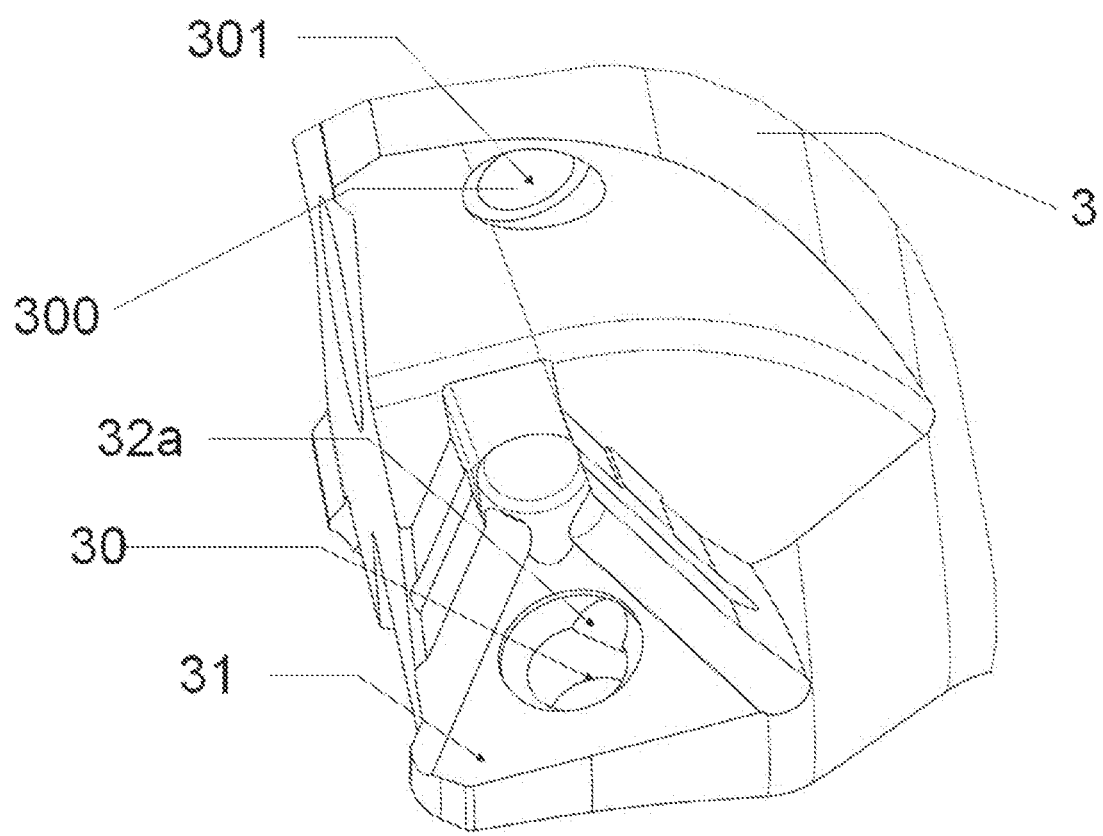
FIG. 4 is a schematic perspective detail top view of a holder comprised by the milling tool embodiment depicted in FIG. 1.

Referring to FIG. 4 (depicting the holder 3 in a perspective top view) an opening 32a of the base channel 32 intersects the hole 31 beneath the base side 31, such that the base channel 32 and the distribution channel 55 are in fluid communication.

FIG. 4 reveals further that the base side 31 is essentially triangular and plane thereby matching the geometry of the shim 5 when viewed in a top view in a direction along the axis 24.

FIG. 4 reveals also that the holder 3 comprises a holder channel 300 for coolant supply towards the insert top side 21 from an outlet opening 301 (which is positioned above the insert top side 21) of the holder channel 300, as apparent from FIG. 2 and FIG. 4 together. The coolant supply from the holder channel 300 flushes machined chips away from the cutting insert 2. The holder channel 300 is in fluid communication with the base channel 32.

Figures 5A, 5B:
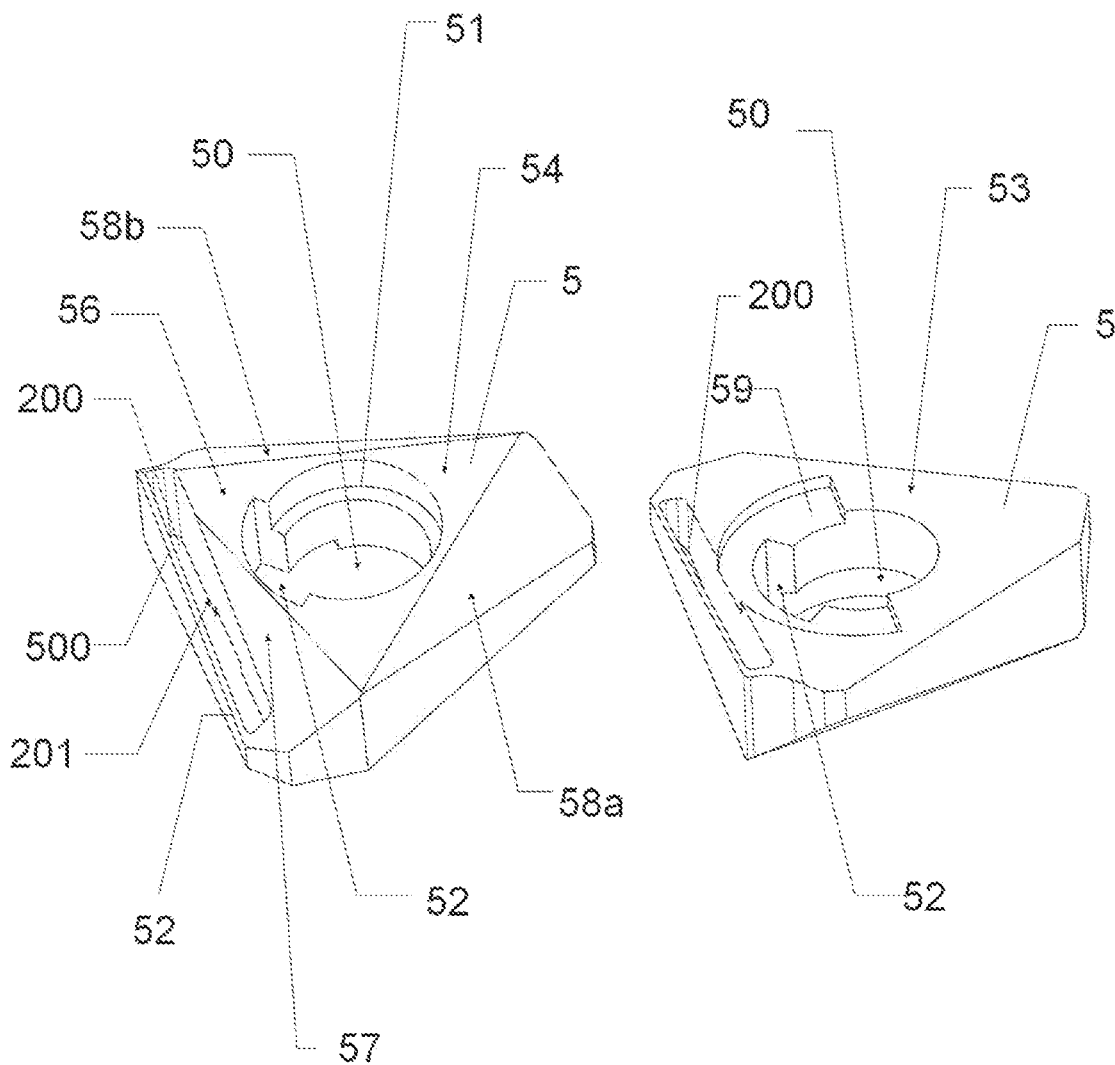
FIG. 5a is a schematic perspective top view of a shim comprised by the milling tool embodiment depicted in FIG. 1.
FIG. 5b is a schematic perspective bottom view of a shim comprised by the milling tool embodiment depicted in FIG. 1.

Referring to FIG. 5a (depicting the shim 5 in a perspective top view) the shim top side 54 has a central facet 56 intersected by the through hole 50 and the shim axial recess 52. The through hole 50 and the shim axial recess 52 form a cavity when the fastener 4 is engaged with the holder 3 as depicted in FIG. 2.

The central facet 56 is a plane support surface for the cutting insert 2 when the fastener 4 is engaged with the holder 3 as depicted in FIG. 2. The central 56 facet is essentially triangular to fit into the depression 210 and the analogously shaped depression of the insert bottom side 25, depending on which of these sides faces the shim 5.

The shim top side 54 has three outer facets 57, 58a and 58b, each directly adjacent to the central facet 56 and each inclined downwards from the central facet 56 towards the shim bottom side 53.

The outer facets 57, 58a and 58b are each inclined to accommodate the inclined cutting edges of the cutting insert 2, i.e. when the insert top side 21 is turned downside, the cutting edges 22, 22' and 22" will be accommodated together with their associated minor cutting edges 22a, 22a' and 22a" by the shim 5.

Where the outer facet 57 is intersected by the opening 201, the inclination of the opening 201 follows the inclination of the outer facet 57 and the opening 201 follows a straight outer edge 500 of the outer facet 57.

FIG. 5a reveals further that the shim abutment protrusion 51 has a circular shape being interrupted by the shim axial recess 52 extending radially farther outwards.

Referring to FIG. 5b (depicting the shim 5 in a perspective bottom view) the shim bottom side 53 is intersected by the through hole 50, a shim bottom recess 59 and the channel 200.

Taking FIG. 5b and FIG. 2 together is it revealed that the shim bottom recess 59 and the base side 31 form cooperatively the distribution channel 55.

The shim bottom recess 59 has an annular shape interrupted by the shim axial recess 52 and the channel 200. The annular shape of the shim bottom recess 59 allows for coolant to be spread out radially to create an excess of coolant to flow into each of the shim axial recess 52 and the channel 200.

Figures 6A, 6B:
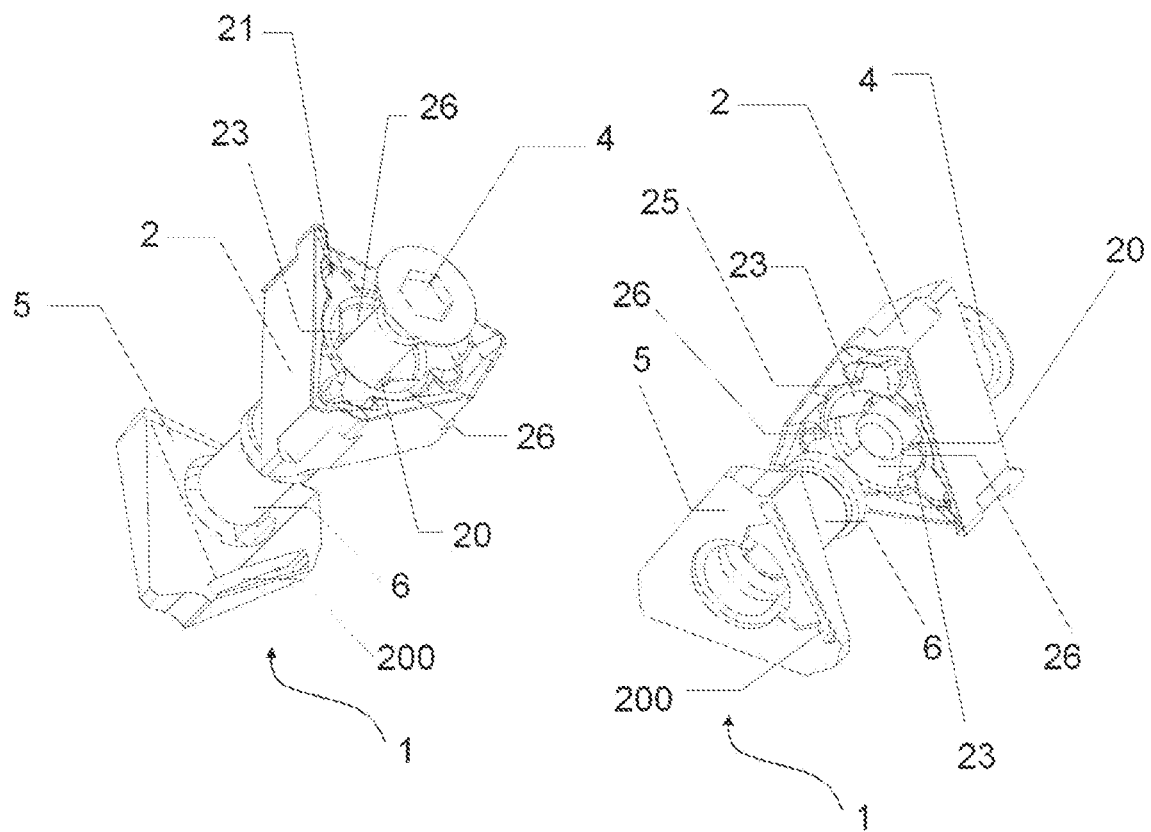
FIG. 6a is an exploded perspective top view of a cutting insert, a fastener, a bushing and a shim comprised by the milling tool embodiment depicted in FIG. 1.
FIG. 6b is an exploded perspective bottom view of a cutting insert, a fastener, a bushing and a shim comprised by the milling tool embodiment depicted in FIG. 1.

FIG. 6a shows in a perspective view partly two of the three insert recesses 26 which allow each for coolant flow within the through hole 20 between the fastener 4 and the cutting insert 2. FIG. 6a reveals especially the funnel-like shape of each of the insert recesses 26 exemplarily.

FIG. 6a shows further partly two of the three insert abutment protrusions 23 against each of which the fastener 4 abuts, such that a sealing is obtained against coolant flow in the through hole 20 where the fastener 4 abuts the insert abutment protrusions 23.

FIG. 6a and FIG. 6b show jointly the top-bottom symmetry of the cutting insert 2.

FIGS. 1 to 6b depict together a milling tool 1 where the cutting insert 2 is supplied with coolant towards its insert top side 21 and, simultaneously, towards its clearance side 27. The former by the channel 100 and the latter by the channel 200 which are both internally supplied with coolant from the base channel 32 through the distribution channel 55; the channel 100 can also be referred to as a first channel 100 and the channel 200 as a second channel 200.

Additionally, a chip evacuating coolant supply from the holder channel 300 is by the milling tool 1 realized.

Figure 7A:
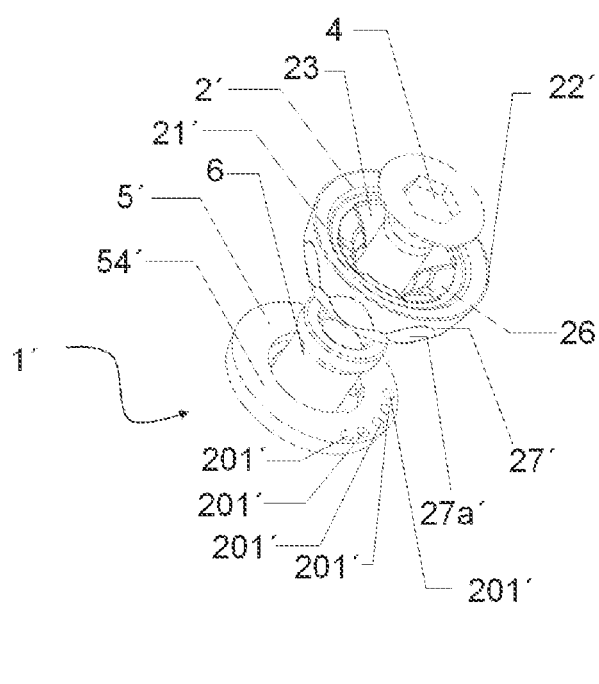
FIG. 7a is an exploded perspective top view of a cutting insert, a fastener, a bushing and a shim comprised by a second embodiment of a milling tool according to the present disclosure.
Figure 7B:
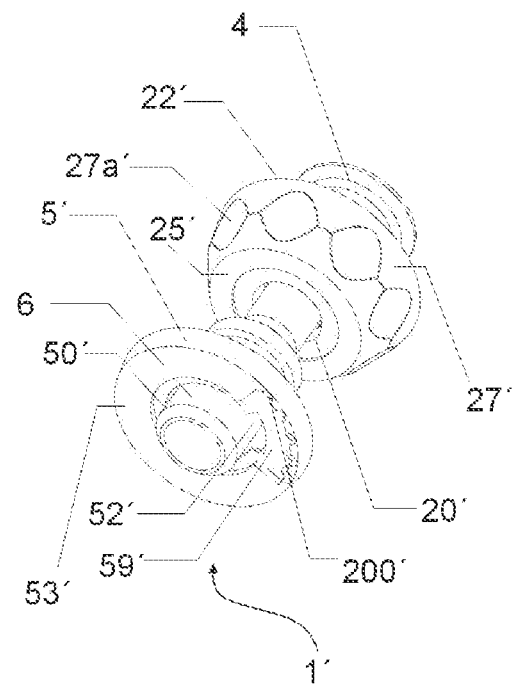
FIG. 7b is an exploded perspective bottom view of the cutting insert, the fastener, the bushing and the shim comprised by the second embodiment of the milling tool.

FIG. 7a and FIG. 7b show a second embodiment of a milling tool 1'.

The milling tool 1' differs from the milling tool 1 only to the extent that a shim 5' is used instead of the shim 5 and a cutting insert 2' is used instead of the cutting insert 2, i.e. especially the same type of double coolant supply and screw fastening is realized in each of the milling tools 1 and 1'.

The cutting insert 2' is essentially round with a circular cutting edge 22', an insert top side 21', an insert bottom side 25', a through hole 20', a clearance side 27' and gripping facets 27a'. The gripping facets 27a' allow for a precise rotation of the cutting insert 2', such that different parts of the cutting edge 22' can be used for cutting.

Since the cutting edge 22' is round, i.e. void of corners, it has an increased stability against mechanical shock under milling.

The insert recesses 26 described for the cutting insert 2 are also used for the cutting insert 2' to form a coolant channel analogously to the channel 100 for coolant supply to the cutting edge 22'.

The insert abutment 23 protrusions of the cutting insert 2' are used as abutments for the fastener 4, i.e. analogously to the insert abutment protrusions 23 of the cutting insert 2.

The shim 5' is a circular plate with a plane shim top side 54' against which the plane insert bottom side 25' is pressed by the engagement of the fastener 4' with the cutting insert 2' and the not depicted holder 3.

The bushing 6, being engaged with the fastener 4 as described for the milling tool 1, abuts the shim 5' analogously to abutting the shim 5.

The shim 5' has bottom side 53' which is intersected by a through hole 50' and a shim bottom recess 59'. The shim bottom recess 59' and the not depicted base side 31 form cooperatively a distribution channel analogously to the distribution channel 55.

The shim bottom recess 59' has an annular shape interrupted by a shim axial recess 52'. The annular shape of the shim bottom recess 59' allows for coolant to be spread out radially to create an excess of coolant to flow into the shim axial recess 52' and each of the channels 200'; each of the channels 200' branches off the bottom recess 59' parallel to the axial extension of the fastener 4 and intersects the shim top side 54'.

Each of the channels 200' can supply coolant to the clearances side 27' out from circular outlet openings 201' (each outlet opening 201' belongs to one of the channels 200'). Thereby the clearance side 22' can be cooled, especially where the clearance side 22' is joined to the insert top side 21' by the cutting edge 22', i.e. the cutting edge 22' can be cooled from below.

The outlet openings 201' are spaced apart and positioned to follow the circular shape of the cutting edge 22' to provide the cutting edge 22' with coolant on parts of the clearance side 27', i.e. the outlet openings 201' follow a circle arc.

FIGS. 7*a* and 7*b* depict together a milling tool 1' where the cutting insert 2' is supplied with coolant towards its insert top side 21' and, simultaneously, towards its clearance side 27'. The former by a channel formed analogously to the channel 100 between the cutting insert 2' and the fastener 4, the latter by the plurality of channels 200' which are internally supplied with coolant from the base channel 32 through a distribution channel formed analogously to the distribution channel 55.

The invention claimed is:

1. A milling tool, comprising:
   a cutting insert, a holder, a fastener and a shim;
   said cutting insert including a cutting edge, a clearance side and an insert top side;
   said holder having a base channel;
   said fastener having a head portion supporting said fastener against said cutting insert and said fastener having an axial portion securing said fastener to said holder, said axial portion extending through said cutting insert, and said axial portion extending at least partly through said shim;
   said fastener forming a first channel cooperatively with said cutting insert, said first channel configured to direct coolant towards said insert top side, and said first channel being in fluid communication with said base channel of said holder; and
   said shim being disposed between said cutting insert and said holder, said shim including a second channel configured to direct coolant toward said clearance side, and said second channel being in fluid communication with said base channel.

2. The milling tool according to claim 1, wherein said second channel has an outlet opening covered partly by said cutting insert on parts of said clearance side, permitting coolant to still exit from said second channel but be obstructed by said cutting insert.

3. The milling tool according to claim 1, wherein said shim includes a plurality of shim channels, said second channel is a shim channel of said plurality of shim channels, each shim channel is configured to direct coolant towards said clearance side, each shim channel is in fluid communication with said base channel, and each shim channel has an outlet opening covered partly by said cutting insert on parts of said clearance side, permitting coolant to still exit from each of said shim channels but be obstructed by said cutting insert.

4. The milling tool according to claim 3, wherein at least two outlet openings of said shim channels emit coolant jets and are positioned to follow at least a section of said cutting edge, permitting said cutting edge to obstruct each of the coolant jets from each of said shim channels belonging to each of said at least two outlet openings.

5. The milling tool according to claim 1, wherein an outlet opening of said second channel is shaped to follow at least a section of said cutting edge, permitting said cutting edge to obstruct a coolant jet from said second channel.

6. The milling tool according to claim 1, wherein said shim is configured and positioned to permit coolant to flow through said shim into said first channel and said second channel.

7. The milling tool according to claim 6, wherein a distribution channel is formed cooperatively by said shim and said holder, permitting coolant to flow from said base channel through said distribution channel into said first channel, and said axial portion extends at least partly through said distribution channel, permitting coolant to flow around said axial portion.

8. The milling tool according to claim 7, wherein said distribution channel is formed on parts of said shim by an open channel structure facing toward said holder.

9. The milling tool according to claim 1, wherein said holder includes a holder channel formed by said holder alone, and said holder channel is configured to direct coolant towards said insert top side from an outlet opening of said holder channel positioned above said insert top side.

10. The milling tool according to claim 1, wherein said axial portion includes a threaded part engaged with said holder beneath said shim.

11. The milling tool according to claim 1, wherein said second channel is configured to direct coolant towards said cutting edge, said cutting edge is formed at a top of a protrusion, and said protrusion protrudes at least as far out from said insert top side as said head portion.

12. A method of using a milling tool, the method comprising using the milling tool according to claim 1 for milling a workpiece.

13. The method according to claim 12, which further comprises using the milling tool for milling a workpiece made from a titanium-based alloy or stainless steel.

14. A milling process, comprising:
   providing a milling tool according to claim 1;
   providing a workpiece; and
   milling the workpiece with the milling tool.

15. The milling process according to claim 14, which further comprises providing a workpiece made from a titanium-based alloy or stainless steel as the workpiece.

* * * * *